(12) United States Patent
Kanemoto

(10) Patent No.: US 12,381,894 B2
(45) Date of Patent: Aug. 5, 2025

(54) DETERMINATION DEVICE, DETERMINATION METHOD, AND DETERMINATION PROGRAM

(71) Applicant: NIPPON TELEGRAPH AND TELEPHONE CORPORATION, Tokyo (JP)

(72) Inventor: Yo Kanemoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 128 days.

(21) Appl. No.: 18/281,761

(22) PCT Filed: Apr. 16, 2021

(86) PCT No.: PCT/JP2021/015759
§ 371 (c)(1),
(2) Date: Sep. 12, 2023

(87) PCT Pub. No.: WO2022/219819
PCT Pub. Date: Oct. 20, 2022

(65) Prior Publication Data
US 2024/0154976 A1 May 9, 2024

(51) Int. Cl.
*G06F 21/55* (2013.01)
*H04L 9/40* (2022.01)

(52) U.S. Cl.
CPC ...... *H04L 63/1416* (2013.01); *H04L 63/1425* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 10,587,647 B1 * | 3/2020 | Khalid | H04L 63/1416 |
| 11,216,554 B2 | 1/2022 | Kanemoto | |
| 2016/0057169 A1 * | 2/2016 | Honda | H04L 63/1416 726/1 |
| 2019/0104152 A1 * | 4/2019 | Boutnaru | G06F 16/24564 |
| 2022/0210184 A1 * | 6/2022 | Nakar | H04L 63/1466 |

FOREIGN PATENT DOCUMENTS

| | | | |
|---|---|---|---|
| CN | 113055399 A * | 6/2021 | |
| JP | 6708794 B2 | 6/2020 | |

* cited by examiner

*Primary Examiner* — Christopher B Robinson

(57) ABSTRACT

A determination device includes processing circuitry configured to extract a series of communication logs of a same session from a communication log in which an attack is to be detected, detect a communication log of a blind attack using a URL of a request destination of the communication log and specify an attack target location of the blind attack and content of the attack from the communication log in which the blind attack has been detected, and extract communication logs in which attack target locations of the blind attack match among the extracted series of communication logs of the same session and determine that the blind attack has succeeded by communication indicated by the series of communication logs in a case where it is determined that there are a plurality of types of the content of the attack and a plurality of response status codes and response sizes.

5 Claims, 8 Drawing Sheets

Fig. 3

| No. | TIME | TRANSMISSION SOURCE | TRANSMISSION DESTINATION | URL | STATUS CODE | RESPONSE SIZE | SESSION |
|---|---|---|---|---|---|---|---|
| 1 | 0 | A | B | /index.php | 200 | 100 | S1 |
| 2 | 1 | A | B | /index.php?id=1 AND user() = 'admin' # | 200 | 100 | S1 |
| 3 | 2 | C | B | /index.php?pw=test' AND user() = 'admin' # | 200 | 100 | S2 |
| 4 | 3 | C | B | /index.php?pw=test' AND user() != 'admin' # | 200 | 100 | S2 |
| 5 | 4 | A | B | /index.php?id='1 AND user() != 'admin' #" | 404 | 200 | S1 |
| 6 | 10 | A | B | /home.php | 200 | 150 | S3 |

Fig. 4

| No. | ATTACK DETECTION | TARGET LOCATION | CONTENT OF BLIND ATTACK |
|---|---|---|---|
| 1 | | | |
| 2 | ATTACK | PARAMETER id | AND user() = 'admin' # |
| 3 | ATTACK | PARAMETER pw | AND user() = 'admin' # |
| 4 | ATTACK | PARAMETER pw | AND user() != 'admin' # |
| 5 | ATTACK | PARAMETER id | AND user() != 'admin' # |
| 6 | | | |

Fig. 5

| No. | ATTACK DETECTION | TARGET LOCATION | CONTENT OF BLIND ATTACK | STATUS CODE | RESPONSE SIZE | SESSION | SUCCESS/FAILURE DETERMINATION |
|---|---|---|---|---|---|---|---|
| 1 | | | | | | | |
| 2 | ATTACK | PARAMETER id | AND user() = 'admin' # | 200 | 100 | S1 | SUCCESS |
| 3 | ATTACK | PARAMETER pw | AND user() = 'admin' # | 200 | 100 | S2 | FAILURE |
| 4 | ATTACK | PARAMETER pw | AND user() != 'admin' # | 200 | 100 | S2 | FAILURE |
| 5 | ATTACK | PARAMETER id | AND user() != 'admin' # | 404 | 200 | S1 | SUCCESS |
| 6 | | | | | | | |

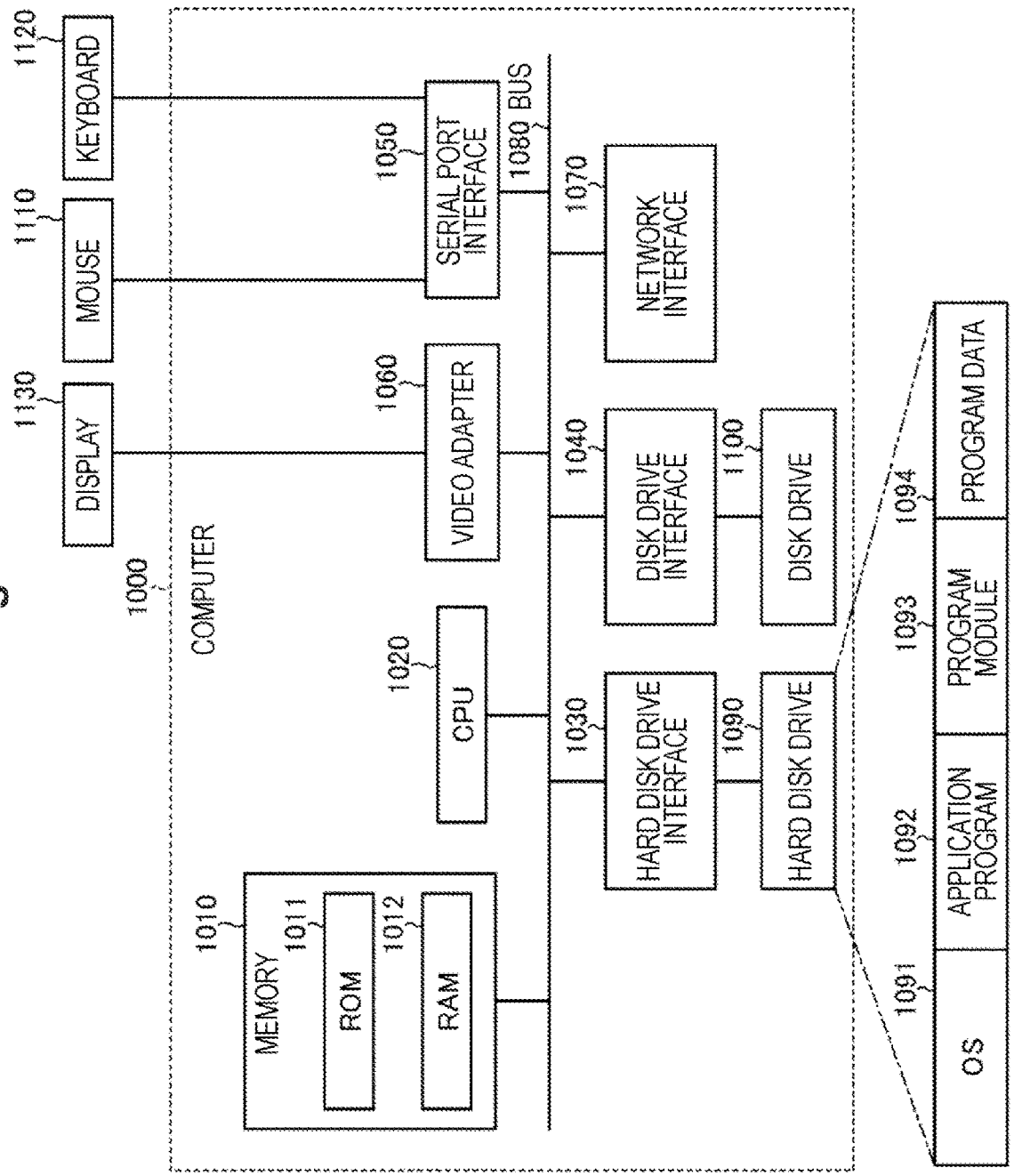

DETERMINATION DEVICE, DETERMINATION METHOD, AND DETERMINATION PROGRAM

CROSS-REFERENCE TO RELATED APPLICATIONS

This application is a U.S. 371 Application of International Patent Application No. PCT/JP2021/015759, filed on 16 Apr. 2021, the disclosure of which is hereby incorporated herein by reference in its entirety.

TECHNICAL FIELD

The present invention relates to a determination device, a determination method, and a determination program for determining whether or not a blind attack has succeeded.

BACKGROUND ART

In related art, a technique for detecting an attack on a web server, or the like, has been proposed. However, if all attacks are detected and alerts are issued, a maintenance person or a monitoring person may overlook the alerts. It is therefore preferable to issue an alert only when the attack has been succeeded. Here, in related art, there is a technique of determining whether or not an attack has succeeded by inspecting a response when the attack is made on a web server, or the like (see Patent Literature 1).

CITATION LIST

Patent Literature

Patent Literature 1: Japanese Patent No. 6708794 B

SUMMARY OF INVENTION

Technical Problem

However, the related art is based on the premise that a trace of an attack appears in a response when the attack is made on a web server, or the like. For example, in a case of an attack (blind attack) in which requests in which different parameters are set are transmitted to an attack target, such as blind SQL injection and blind OS command injection, and information is searched from a difference in response, a trace of the attack does not explicitly appear in the response. For this reason, in related art, it cannot be determined whether or not the attack has succeeded.

Example 1: Case of Blind SQL Injection

For example, a case will be considered where a web application/index.php is vulnerable to SQL injection, and the following blind attack is received.
GET /index.php?id="1 AND user( ) = 'admin' #"
GET /index.php?id="1 AND user( ) != 'admin'#"
If this blind attack succeeds, information that a user connected to a database (DB) is an admin is leaked. Even if this attack succeeds, a trace of the attack (for example, a character string "admin") does not appear in content of a response.

Example 2: Blind OS Command Injection

In addition, a case where the following blind attack is received will be considered.
GET /index.php?name=x; X=$(cat /etc/passwd|tail -n 1|cut -f 1 -d":");test $X = "admin"
GET /index.php?name=x; X=$(cat /etc/passwd|tail -n 1|cut -f 1 -d":");test $X != "admin"
If this blind attack succeeds, information that a recently created user name is admin is leaked. Similarly to Example 1, even if this attack succeeds, a trace of the attack (for example, a character string "admin") does not appear in content of a response.

It is therefore an object of the present invention to solve the above problem and determine whether or not a blind attack has succeeded.

Solution to Problem

In order to solve the above problem, a determination device includes: processing circuitry configured to: extract a series of communication logs of a same session from a communication log in which an attack is to be detected; detect a communication log of a blind attack using a URL of a request destination of the communication log and specify an attack target location of the blind attack and content of the attack from the communication log in which the blind attack has been detected; extract communication logs in which attack target locations match among the extracted series of communication logs of the same session and determine that the blind attack has succeeded by communication indicated by the series of communication logs in a case where it is determined that there are a plurality of types of the content of the attack and a plurality of response status codes and response sizes in the extracted communication logs; and output a result of the determination.

Advantageous Effects of Invention

According to the present invention, it is possible to determine whether or not a blind attack has succeeded.

BRIEF DESCRIPTION OF DRAWINGS

FIG. 3 is a view illustrating an example of a communication log of FIG. 2.
FIG. 4 is a view illustrating an example of detection data in FIG. 2.
FIG. 5 is a view for explaining success/failure determination by a success/failure determination unit in FIG. 2.
FIG. 8 is a view illustrating a configuration example of a computer that executes a determination program.

DESCRIPTION OF EMBODIMENTS

Hereinafter, modes for carrying out the present invention (embodiments) will be described with reference to the drawings. The present invention is not limited to the embodiments described below.

[Outline] Outline of a determination device 10 according to the present embodiment will be described. Note that, in the following description, a blind attack is an attack that transmits requests in which different parameters are set to an attack target and searches information from a difference in response to the requests.

Figure 1:
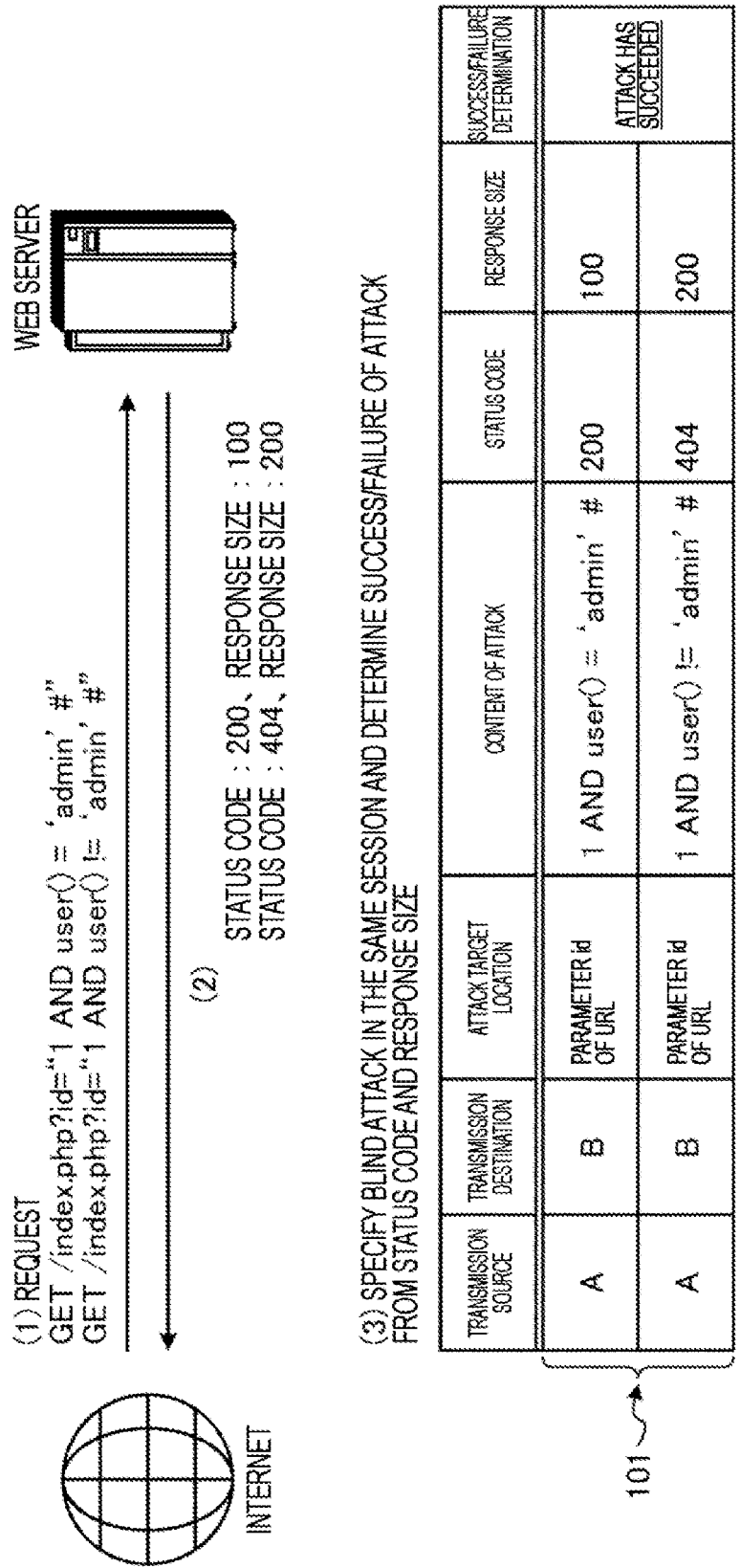
FIG. 1 is a view for explaining operation outline of a determination device.

For example, as illustrated in FIG. 1, the determination device 10 acquires a request ((1)) to a web server and a status code and a response size ((2)) of a response to the request from a communication log of communication performed with the web server. Then, the determination device 10 specifies a blind attack in the same session on the basis of the acquired data and determines success/failure of the attack from the status code and the response size ((3)).

For example, the determination device 10 extracts a series of communication logs (see reference numeral 101 in FIG. 1) of the same session from the acquired communication log. Then, the determination device 10 determines whether or not the series of communication is a blind attack from a URL, or the like, of a request destination of the extracted series of communication logs.

Here, in a case where the determination device 10 determines that the series of communication is a blind attack, an attack target location is the same (for example, a parameter id of the URL), content of the attack (for example, parameters, or the like, set in the request) is different, and the status code and the response size of the response are different, the determination device 10 determines that the blind attack by the series of communication indicated by the reference numeral 101 has succeeded.

In this manner, the determination device 10 can detect a blind attack and determine whether or not the blind attack has succeeded.

[Configuration Example] Next, a configuration example of the determination device 10 will be described with reference to FIG. 2. The determination device 10 includes a storage unit 11 and a control unit 12. The storage unit 11 stores data to be referred to when the control unit 12 executes various kinds of processing and data generated by execution of various kinds of processing.

For example, the storage unit 11 stores a communication log which is a communication log in which an attack is to be detected, session data (details will be described later) extracted by the control unit 12, detection data (details will be described later), determination result data as to whether or not the attack has succeeded, and the like.

For example, as illustrated in FIG. 3, the communication log includes occurrence time of communication, a transmission source and a transmission destination of a request, a URL of a request destination, a status code and a response size, and the like, of a response for each identification information (No.) of the communication log in which an attack is to be detected. Note that the communication log is input via, for example, an input/output unit (not illustrated) of the determination device 10.

The control unit 12 controls the entire determination device 10. The control unit 12 includes a session extraction unit 121, a blind attack detection unit 122, a success/failure determination unit 123, and a determination result output unit 124.

The session extraction unit 121 extracts a communication log of the same session from the communication log. For example, the session extraction unit 121 extracts, from the communication log, communication logs of a series of communication performed within a predetermined period with the same transmission source and transmission destination as the communication logs of the same session.

For example, the session extraction unit 121 extracts, from the communication log illustrated in FIG. 3, communication logs of [1, 2, 5], [3, 4], and [6] in which the transmission source and the transmission destination are the same and communication has been performed within T=5 as communication logs of communication of the same session. Then, the session extraction unit 121 adds session identification information (for example, S1, S2, and S3) to each extracted communication log.

Thereafter, the session extraction unit 121 stores, as session data, information (for example, S1=[1, 2, 5], S2=[3, 4], S3=[6]) indicating identification information of a session and identification information of communication logs corresponding to the session in the storage unit 11.

Figure 2:
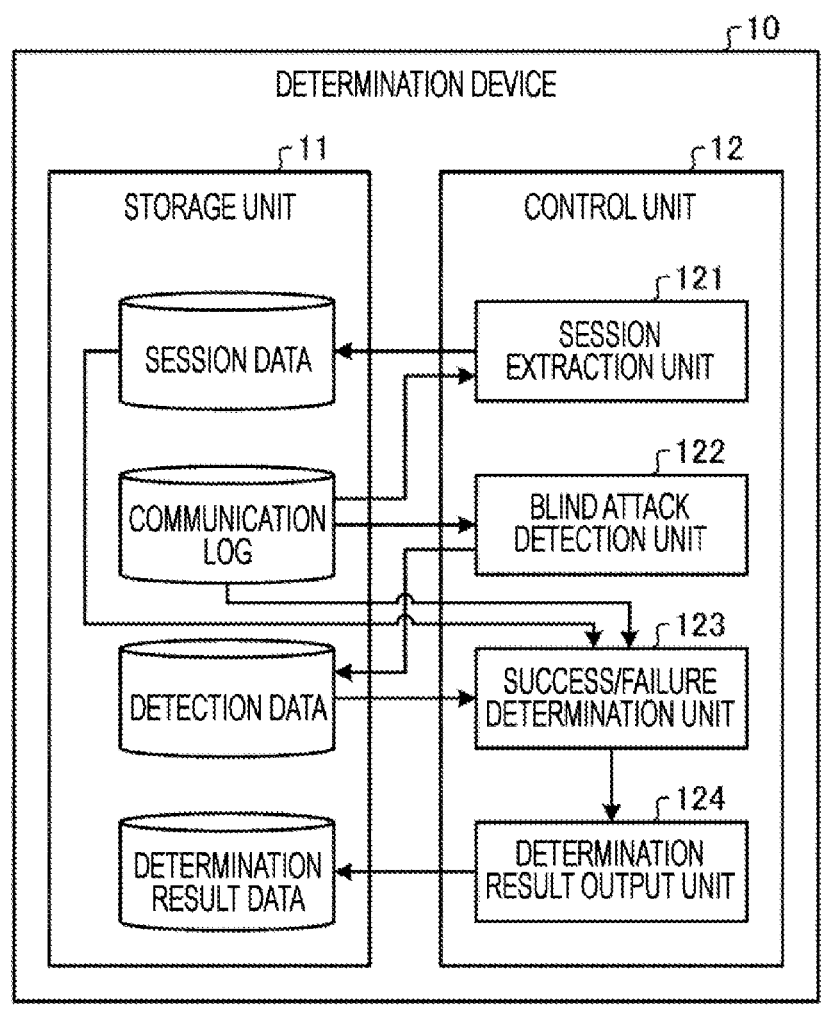
FIG. 2 is a view illustrating a configuration example of the determination device.

The description returns to FIG. 2. For example, the blind attack detection unit 122 determines whether or not a request indicated by the communication log is a blind attack using existing signature detection.

For example, a case will be considered where a detection signature is a regular expression "AND .* [!=<>]+ .* #". In this case, the blind attack detection unit 122 detects [2, 3, 4, 5] having the above detection signature from the communication logs illustrated in FIG. 3 as the communication log of the blind attack (see FIG. 4).

As illustrated in FIG. 4, for example, the blind attack detection unit 122 also specifies a target location of the blind attack and content of the blind attack from the communication log of the blind attack. Then, the blind attack detection unit 122 stores the identification information (No.) of the communication log in which the blind attack has been detected, the target location of the blind attack, the information indicating the content of the blind attack, and the like, (see FIG. 4) in the storage unit 11 as detection data.

Note that the signature to be used by the blind attack detection unit 122 to detect the blind attack may be a regular expression "test ¥$.+ !?=", a regular expression "test ¥$.+ −(z|n|eq|ne|gt|ge|lt|le)", or the like, in addition to the above regular expression "AND .* [!=<>]+ .* #". The blind attack detection unit 122 can detect an attack by blind OS command injection by using a regular expression "test ¥$.+ !?=" and a regular expression "test ¥$.+ −(z|n|eq|ne|gt|ge|lt|le)" as a blind attack signature.

The description returns to FIG. 2. The success/failure determination unit 123 extracts communication logs in which the attack target locations match among the communication logs of the same session. Then, in a case where it is determined that there are a plurality of types of content of the attack of the extracted communication logs and there are a plurality of status codes and response sizes of the response, the success/failure determination unit 123 determines that the blind attack has succeeded. On the other hand, in a case where the success/failure determination unit 123 determines that there are not a plurality of types of content of the attack of the extracted communication logs, that there are not a plurality of response status codes, or that there are not a plurality of response sizes, it is determined that the blind attack has failed.

For example, the success/failure determination unit 123 refers to session data and extracts communication logs of the same session from the communication log. Then, the success/failure determination unit 123 refers to the detection data and specifies, from the extracted communication log, communication logs in which the blind attack is detected and the attack target locations match.

For example, in the communication log illustrated in FIG. 5, the blind attacks of the communication logs No. 2 and No. 5 belong to the session S1, and the attack target places match with a parameter id. In addition, the blind attacks of the communication logs No. 2 and No. 5 have content different from each other and have the status codes and the response sizes different from each other, and thus, the success/failure determination unit 123 determines that the attack has succeeded.

On the other hand, in the communication log illustrated in FIG. 5, the blind attacks of communication logs No. 3 and No. 4 belong to the session S2, and the attack target locations match with a parameter pw. In addition, although the blind attacks of the communication logs No. 3 and No. 4 have content different from each other, the blind attacks of the communication logs No. 3 and No. 4 have the same status code and the same response size, and thus, the success/failure determination unit 123 determines that the attack has failed.

The description returns to FIG. 2. The determination result output unit 124 outputs a determination result by the success/failure determination unit 123. The determination result output unit 124 outputs a determination result that the communication logs No. 2 and No. 5 among the communication log indicate a blind attack on the parameter id and the attack has succeeded.

In this manner, the determination device 10 can detect a blind attack and determine whether or not the blind attack has succeeded from behavior of communication in the session in which the attack is made without modifying the existing system.

Figure 6:
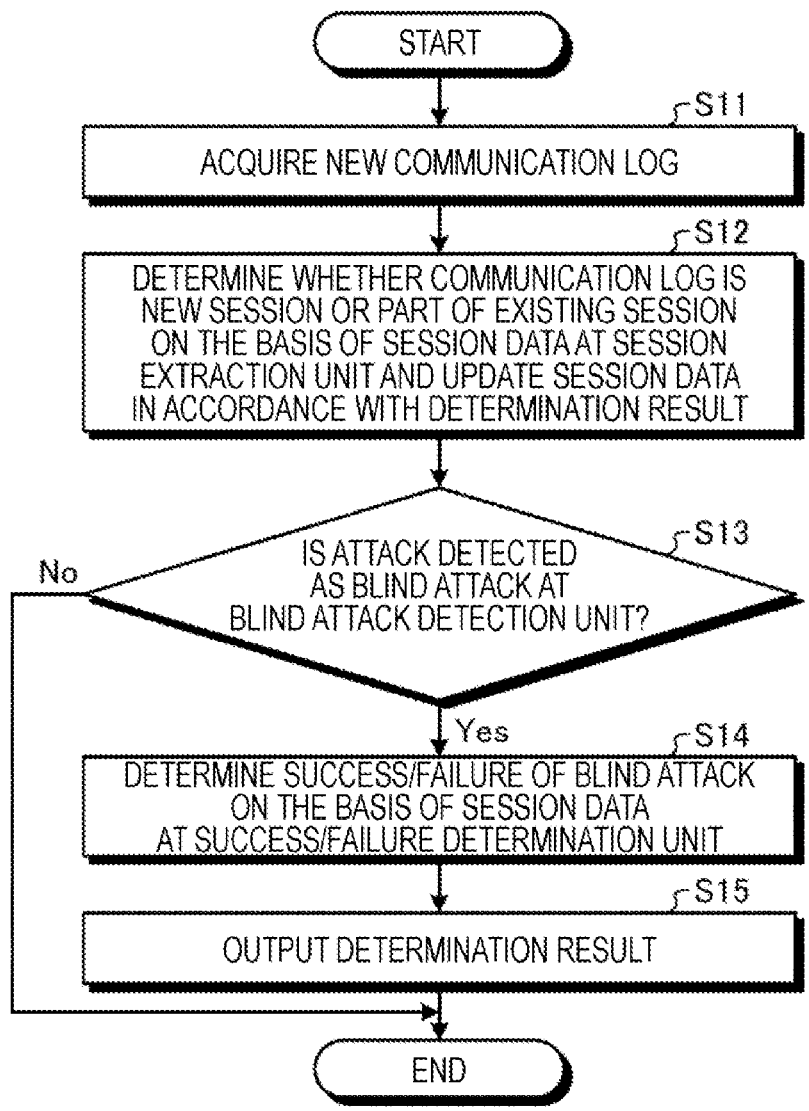
FIG. 6 is a flowchart illustrating an example of processing procedure of the determination device.

[Example of Processing Procedure] Next, an example of processing procedure of the determination device 10 will be described with reference to FIG. 6. When the determination device 10 acquires a new communication log (S11), the session extraction unit 121 determines whether the communication log is a new session or part of the existing session on the basis of the session data and updates the session data according to the determination result (S12).

After S12, it is determined whether or not the new communication log acquired in S11 is detected as a blind attack by the blind attack detection unit 122 (S13). In a case where the blind attack detection unit 122 detects the new communication log as the blind attack (Yes in S13), the success/failure determination unit 123 determines success/failure of the blind attack on the basis of the session data (S14). Then, the determination result output unit 124 outputs the determination result in S14 (S15). On the other hand, in a case where the blind attack detection unit 122 does not detect the new communication log as the blind attack (No in S13), the processing ends.

By the determination device 10 performing the above processing, it is possible to detect a blind attack and determine whether or not the blind attack has succeeded from behavior of communication in the session in which the attack is made without modifying the existing system. As a result, a maintenance person or an administrator can separate an alert to be prioritized and an alert not to be prioritized with respect to the attack described above, and thus, can efficiently perform the security operation.

Figure 7:
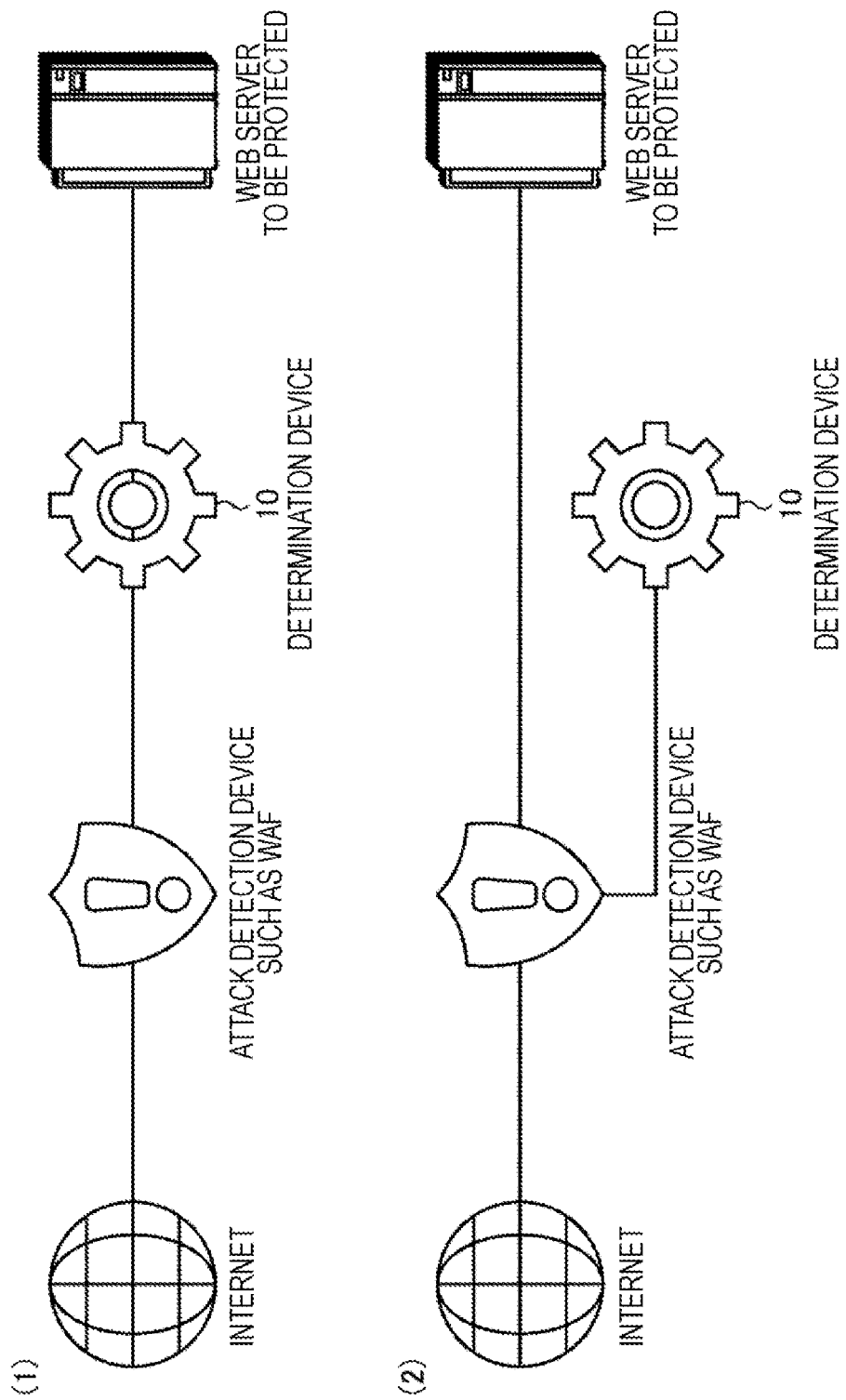
FIG. 7 is a view illustrating a configuration example of a system including the determination device.

[Other Embodiments] Note that the blind attack detection unit 122 in the determination device 10 may be provided outside the determination device 10. For example, as illustrated in (1) and (2) of FIG. 7, the blind attack detection unit 122 may be implemented by an attack detection device such as a web application firewall (WAF) provided outside the determination device 10. Furthermore, as illustrated in (1) of FIG. 7, the determination device 10 may have a configuration (inline configuration) in which the determination device 10 is directly connected to a web server for which success/failure of an attack is to be determined, or as illustrated in (2) of FIG. 7, may have a configuration (tap configuration) in which the determination device 10 is connected to the web server via an attack detection device such as a WAF.

[System Configuration and Others] Each component of each unit illustrated in the drawings is functionally conceptual and does not necessarily need to be physically configured as illustrated in the drawings. In other words, a specific form of distribution and integration of individual devices is not limited to the illustrated form, and all or part thereof can be functionally or physically distributed and integrated in any unit according to various loads, usage conditions, and the like. Further, all or any part of each processing function performed in each device can be implemented by a CPU and a program to be executed by the CPU or can be implemented as hardware by wired logic.

In the processing described in the above embodiment, all or part of processing described as being automatically performed may be manually performed, or all or part of processing described as being manually performed may be automatically performed by a known method. In addition, the processing procedure, the control procedure, the specific names, and the information including various types of data and parameters illustrated in the above document and the drawings can be freely changed unless otherwise specified.

[Program] The determination device 10 described above can be implemented by installing a program in a desired computer as package software or online software. For example, by causing an information processing device to perform the above-described program, the information processing device can be caused to function as the determination device 10. The information processing device mentioned here includes a desktop or a laptop personal computer. In addition, the information processing device also includes mobile communication terminals such as a smartphone, a mobile phone, and a personal handy-phone system (PHS) and terminals such as a personal digital assistant (PDA).

In a case where a terminal device to be used by a user may be implemented as a client, the determination device 10 may also be implemented as a server device that provides a service related to the above-described processing to the client. In this case, the server device may be implemented as a web server or may be implemented as a cloud that provides a service regarding the above-described processing by outsourcing.

FIG. 8 is a view illustrating an example of a computer that executes a determination program. A computer 1000 includes, for example, a memory 1010 and a CPU 1020. In addition, the computer 1000 further includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk and an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. In other words, a program that defines each kind of processing to be executed by the determination device 10 is implemented as the program module 1093 in which codes executable by the computer are described. The program module 1093 is stored in, for example, the hard disk drive 1090. For example, the program module 1093 executing similar processing to the functional configurations in the determination device 10 is stored in the hard disk drive 1090. Note that the hard disk drive 1090 may be replaced with a solid state drive (SSD).

Data to be used in the processing of the above embodiments is stored in, for example, the memory 1010 or the hard disk drive 1090 as the program data 1094. In addition, the CPU 1020 reads the program module 1093 and the program data 1094 stored in the memory 1010 and the hard disk drive 1090 into the RAM 1012 as necessary and executes the program module 1093.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

REFERENCE SIGNS LIST

10 Determination device
11 Storage unit
12 Control unit
121 Session extraction unit
122 Blind attack detection unit
123 Success/failure determination unit
124 Determination result output unit

The invention claimed is:

1. A determination device comprising:
processing circuitry configured to:
extract a series of communication logs of a same session from a communication log in which an attack is to be detected;
detect a communication log of a blind attack using a URL of a request destination of the communication log and specify an attack target location of the blind attack and content of the attack from the communication log in which the blind attack has been detected;
extract communication logs in which attack target locations of the blind attack match among the extracted series of communication logs of the same session and determine that the blind attack has succeeded by communication indicated by the series of communication logs in a case where it is determined that there are a plurality of types of the content of the attack and a plurality of response status codes and response sizes in the extracted communication logs; and
output a result of the determination.

2. The determination device according to claim 1, wherein the processing circuitry is further configured to detect
the communication log of the blind attack by applying an attack detection signature to the URL of the request destination of the communication log.

3. The determination device according to claim 1, wherein the processing circuitry is further configured to detect
the communication log of the blind attack using a regular expression "AND.*[!=< >]+.*#", "test \$.+ !?=", or a regular expression "test \$.+ -(z|n|eq|ne|gt|ge|lt|le)", or any combination thereof, as an attack detection signature.

4. A determination method executed by a determination device, the determination method comprising:
extracting a series of communication logs of a same session from a communication log in which an attack is to be detected;
detecting a communication log of a blind attack using a URL of a request destination of the communication log and specifying an attack target location of the blind attack and content of the attack from the communication log in which the blind attack has been detected;
extracting communication logs in which attack target locations of the blind attack match among the extracted series of communication logs of the same session and determining that the blind attack has succeeded by communication indicated by the series of communication logs in a case where it is determined that there are a plurality of types of the content of the attack and a plurality of response status codes and response sizes in the extracted communication logs; and
outputting a result of the determination.

5. A non-transitory computer-readable recording medium storing therein a determination program that causes a computer to execute a process comprising:
extracting a series of communication logs of a same session from a communication log in which an attack is to be detected;
detecting a communication log of a blind attack using a URL of a request destination of the communication log and specifying an attack target location of the blind attack and content of the attack from the communication log in which the blind attack has been detected;
extracting communication logs in which attack target locations of the blind attack match among the extracted series of communication logs of the same session and determining that the blind attack has succeeded by communication indicated by the series of communication logs in a case where it is determined that there are a plurality of types of the content of the attack and a plurality of response status codes and response sizes in the extracted communication logs; and
outputting a result of the determination.

* * * * *